(12) United States Patent
Winter et al.

(10) Patent No.: US 6,633,815 B1
(45) Date of Patent: Oct. 14, 2003

(54) METHOD FOR MEASURING THE DISTANCE AND SPEED OF OBJECTS

(75) Inventors: Klaus Winter, Schwieberdingen (DE); Reiner Marchthaler, Gingen (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,558

(22) PCT Filed: Nov. 14, 2000

(86) PCT No.: PCT/DE00/04022
§ 371 (c)(1),
(2), (4) Date: Feb. 1, 2002

(87) PCT Pub. No.: WO01/50152
PCT Pub. Date: Jul. 12, 2001

(30) Foreign Application Priority Data

Dec. 29, 1999 (DE) .......................................... 199 63 625

(51) Int. Cl.[7] .................................................. G06G 7/78
(52) U.S. Cl. ......................... 701/301; 701/96; 342/107
(58) Field of Search .................. 701/301, 96; 342/109, 342/128, 107

(56) References Cited

U.S. PATENT DOCUMENTS

| 4,361,202 A | * | 11/1982 | Minovitch | 104/88.02 |
| 4,646,092 A | * | 2/1987 | Schreuder | 342/125 |
| 4,661,817 A | * | 4/1987 | Bekkadal et al. | 342/124 |
| 5,483,242 A | * | 1/1996 | Grein et al. | 342/111 |
| 5,606,737 A | * | 2/1997 | Suzuki et al. | 332/136 |
| 5,659,320 A | * | 8/1997 | Pouit | 342/109 |
| 5,710,565 A | * | 1/1998 | Shirai et al. | 340/903 |
| 5,867,120 A | * | 2/1999 | Ishikawa et al. | 342/175 |
| 5,929,802 A | | 7/1999 | Russell et al. | |
| 6,008,755 A | * | 12/1999 | Ishikawa et al. | 333/137 |
| 6,069,581 A | * | 5/2000 | Bell et al. | 342/70 |
| 6,073,078 A | * | 6/2000 | Kitahara et al. | 342/179 |
| 6,133,887 A | * | 10/2000 | Tanizaki et al. | 333/159 |
| 6,172,648 B1 | * | 1/2001 | Tanizaki et al. | 343/753 |
| 6,218,981 B1 | * | 4/2001 | Uehara | 342/107 |
| 6,232,910 B1 | * | 5/2001 | Bell et al. | 342/104 |
| 6,268,833 B1 | * | 7/2001 | Tanizaki et al. | 343/766 |
| 6,370,475 B1 | * | 4/2002 | Breed et al. | 340/436 |
| 6,380,883 B1 | * | 4/2002 | Bell et al. | 342/70 |
| 6,400,308 B1 | * | 6/2002 | Bell et al. | 340/901 |

FOREIGN PATENT DOCUMENTS

| DE | 40 40 572 | 6/1992 |
| DE | 42 42 700 | 6/1994 |
| DE | 198 32 800 | 2/1999 |
| JP | 10 048 333 | 2/1998 |

\* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A method for measuring the distance and speed of objects using electromagnetic waves with a motor vehicle radar system is described, electromagnetic waves being transmitted and simultaneously received, the transmitted electromagnetic waves being modulated in the shape of a ramp, at least the signals received during one rise and one drop of the frequency of the transmitted signal being mixed in each case with the transmitted signal, a number of intermediate frequency signals being formed, and the distance and speed of the object being calculated using the intermediate frequency, a weather condition in the vicinity of the motor vehicle and/or a disturbance in the motor vehicle radar system being identified on the basis of characteristic intermediate frequency signals.

7 Claims, 1 Drawing Sheet

METHOD FOR MEASURING THE DISTANCE AND SPEED OF OBJECTS

The present invention relates to a method for measuring the distance and speed of objects according to the preamble of the main claim. Such methods for measuring the distance and speed of objects are employed for example as part of an automatic cruise control system of a vehicle to detect vehicles traveling ahead. A system of this type is also referred to as an adaptive cruise control (ACC) system.

BACKGROUND INFORMATION

Various methods have become known for measuring a distance with the help of electromagnetic waves (radar). In the case of the system known as FMCW radar, electromagnetic waves whose frequency is modulated essentially in the shape of a ramp between two values are continuously transmitted. In the known methods of this type the received reflected waves are mixed with the simultaneously transmitted waves. During the change of frequency, i.e. during the ramp of the modulation signal, conclusions about the elapsed time and thus about the distance of the object can easily be drawn from the intermediate frequency obtained from simple mixing.

If the reflecting object is moving relative to the measuring location, the reflected signal undergoes a Doppler shift. This is utilized in a method known from German Patent Application 40 40 572 A1 for measuring the distance and speed by measuring the frequency difference during a rise and during a drop in the frequency of the transmitted waves and calculating the speeds from the differential between the frequency differences, and calculating the distance from the mean of the frequency differences. In one exemplary embodiment of this known method the wave reflected from an object or the intermediate frequency signal derived therefrom is evaluated.

From German Patent Application 42 42 700 A1 a method is known for measuring the distance and speed of objects which performs a spectral analysis of the intermediate frequency signal which arises from mixing the transmitted and received signals and calculates the distance and speed of at least one object from the frequency of spectral lines.

One method according to the present invention for measuring the distance and speed of objects is further developed from the related art by the fact that in a method for measuring the distance and speed of objects using electromagnetic waves with a motor vehicle radar system, electromagnetic waves being transmitted and simultaneously received, the transmitted electromagnetic waves being modulated in the shape of a ramp, at least the signals received during one rise and one drop of the frequency of the transmitted signal being mixed in each case with the transmitted signal, a number of intermediate frequency signals being formed, and the distance and speed of the object being calculated using the intermediate frequency signals, a weather condition in the vicinity of the motor vehicle and/or a disturbance in the motor vehicle radar system is identified.

Using this extension of a method known from the related art according to the present invention, information can be stated in a simple and reliable manner about the environmental conditions and the operating state of the motor vehicle radar system. In particular it is possible to differentiate between the weather conditions of dryness and bad weather, and soiling of a covering of the motor vehicle radar system can be identified. The characteristic intermediate frequency signals are characterized according to the present invention by the fact that the intermediate frequency signals have approximately the same magnitude with respect to each other.

The preferred extension of the method according to the present invention provides that on the basis of the detected weather condition and/or disturbance the present range is determined and/or present system performance of the motor vehicle radar system is checked. For this purpose, it is advantageous to have a characteristic map for determining the current range and/or the current system performance, containing at least characteristic intermediate frequencies, stored in a memory unit of the motor vehicle radar system. On the basis of the determination of system performance a speed recommendation is signaled advantageously to the driver of the motor vehicle, so that the driver can adjust the speed to the external environmental conditions.

Radar signals are attenuated only to an insignificant degree by rain, and snowfall leads to a loss of range which depends on the density of the snowfall and the form of snow. In both cases radar reflections are generated which are characteristic for the weather conditions and whose amplitude is a measure of the available radar range. Part of the emitted electromagnetic waves is scattered by the raindrops or snowflakes and returns to the receiver. There these scatter echoes are detected and interpreted according to the present invention. Rain and snow reflections exhibit in particular the characteristic properties that they appear at an extremely close distance directly in front of the vehicle and are measured with an approximation using a relative speed corresponding to the speed of the vehicle itself (nearly stationary objects).

DETAILED DESCRIPTION

The following explains an exemplary embodiment of the method according to the present invention for measuring the distance and speed of objects on the basis of a drawing.

Figure 1:
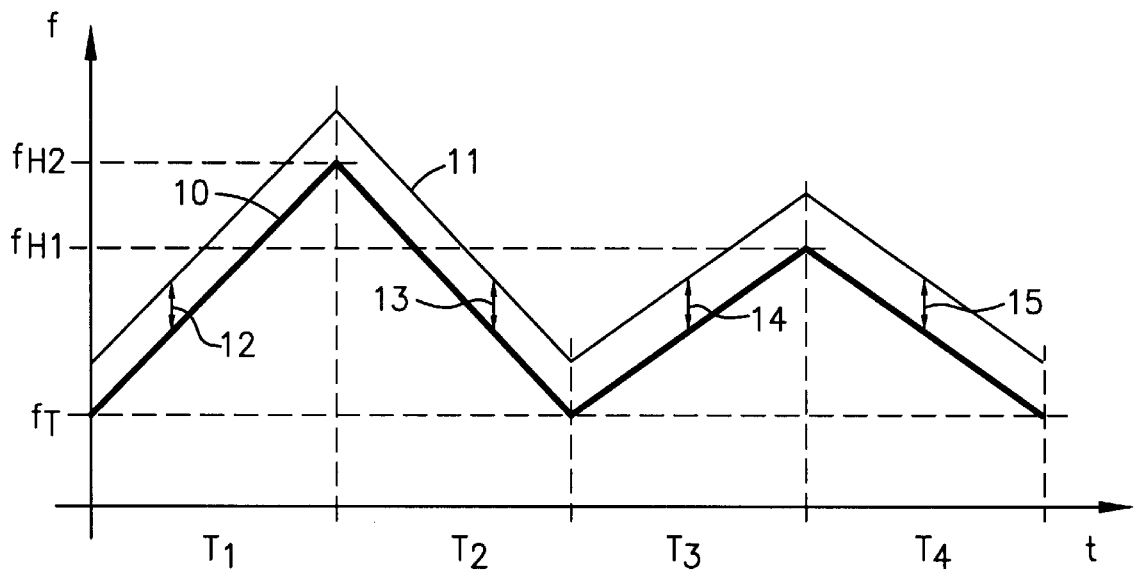
FIG. 1 shows a variation over time of a frequency of a transmitted signal and a received signal according to the present invention.
Figure 2:
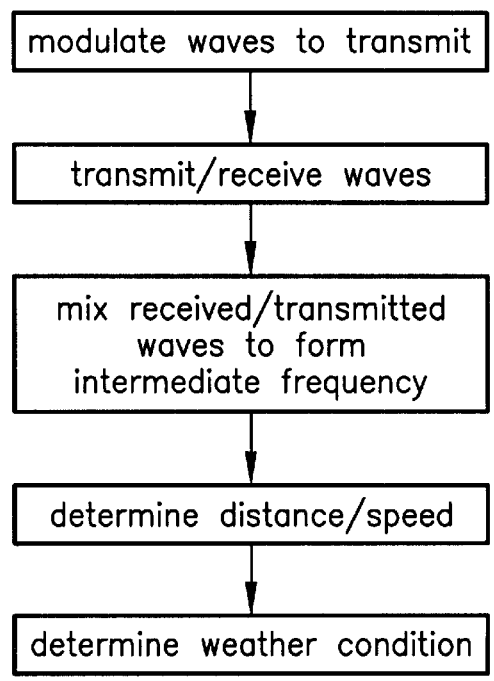
FIG. 2 shows a method according to an example embodiment of the present invention.

FIG. 1 shows the variation over time of the frequency of a transmitted signal 10 and a received signal 11 of a motor vehicle radar system which operates according to the FMCW method. In the coordinate system illustrated time t is recorded on the horizontal axis and frequency f on the vertical axis. Received signal 11 represents the electromagnetic wave reflected by an object.

In one measuring cycle (containing four ramps in this exemplary embodiment) the frequency of emitted signal 10 rises during a first ramp (duration $T_1$), drops off again during a second ramp (duration $T_2$) and rises again during a third ramp (duration $T_3$), then drops off again during a fourth ramp (duration $T_4$). During the last two ramps the frequency rises or falls with a rate of change which is smaller than that during the first two ramps. It is advantageous for the corresponding rate of change or the ramp slope to be selected such that the influence of the Doppler effect is smaller than the influrnce of the elapsed time. Furthermore the slope of the ramps influences the resolution in such a way that when the slope of the ramp is relatively small the greater influence of the Doppler effect produces a greater resolution of the speed, whereas with steeper ramps the Doppler effect has less influence and consequently it is easier to identify an object by its distance. Through the change made in the slope of the ramp in this exemplary embodiment, both the speed and the distance of a detected target object can be determined with good resolution.

The frequency of transmitted signal 10 rises in each case from a carrier frequency $f_T$ by a first or second frequency shift $f_{H1/H2}$, and then drops back down to carrier frequency $f_T$. The ramp duration T (in this exemplary embodiment the choice is made so that $T_1=T_2=T_3=T_4=T$, which does not signify a restriction of the invention) is preferably about 1 ms for the distances and speeds to be measured in traffic.

Frequency increases 12, 13, 14 and 15 result from the Doppler effect in such a way that the frequency of the received signal is increased for objects which are moving relative to and in the direction of the location of measurement (the user's own vehicle equipped with the radar system), and is reduced for objects which are moving away. The detection of such an object can be recognized in the curves according to FIG. 1 from the fact that the curve of received signal 11 shows a higher maximum than the curve of transmitted signal 10. Frequency increases 12, 13, 14 and 15 due to the Doppler effect generally result in $f_D=2 \cdot f_T \cdot v_r/c$, where $v_r$ is the (positive or negative) relative speed between the user's own motor vehicle and the detected object, and c is the speed of light. Here in general frequency increases 12, 13, 14 and 15 can exhibit a different height in each ramp due to the Doppler effect, depending upon whether the same object has been detected or a different one. With carrier frequency $f_T$ constant, frequency increase 12, 13, 14 and 15 is thus proportional to the relative speed $v_r$ because of the Doppler effect $f_D$. For the special case where a stationary object (positioned for example at the side of the road) is detected, relative speed $v_r$ corresponds to the vehicle's own speed $v_e$. This relationship is utilized according to the present invention in order to recognize detected raindrops, fog, hail, or snow in part by the fact that the relative speed $v_r$ of the detected object corresponds approximately to the motor vehicle's own speed $v_e$: $v_r \approx v_e$.

An additional shift in the curve of the frequency of received signal 11 compared to the curve of the frequency of transmitted signal 10 would result from the signal propagation time of the electromagnetic wave. The curve of the frequency of received signal 11 would be shifted by the propagation time $T_L=2 \cdot d/c$, where d is the distance of the reflected object. The frequency of transmitted signal 10 would increase during this propagation time $t_L$ by the value $\Delta f=(f_H/T) \cdot t_L=2 \cdot d \cdot f_H/(T \cdot c)$. Here $f_H/T$ represents the rate of rise of the frequency. In the exemplary embodiment in accordance with FIG. 1 the special case is shown in which the propagation time $t_L$ is approximately 0. Such a propagation time occurs in the case of target objects or reflection objects which are located directly in front of the motor vehicle radar system. According to the present invention, this relationship is utilized in order to recognize detected raindrops, fog, hail or snow in part from the fact that distance d of the detected object is approximately 0. Here the following principle applies: distance of the reflected object $d \approx 0$. In this simplification it is assumed that in the case of rain, fog, hail or snow there are always reflection objects immediately in front of the motor vehicle radar system.

In general therefore the present value of the frequency of the received signal arises from the sum of the frequency increases due to the Doppler effect and due to the signal propagation time of the electromagnetic wave. Accordingly, the frequency increase depends in general on the distance of the reflection object d and the relative speed $V_r$ of the reflection object. If at least the relationships during two frequency ramps are used in the evaluation, then at least two equations are available for determining the two unknowns d and $v_r$. In the practical implementation of the method according to the present invention, received signals 11 are mixed with transmitted signals 10, so that intermediate frequencies result which also contain the frequency increases 12, 13, 14 and 15. Subsequent processing of the intermediate frequencies, in particular a spectral analysis, can follow. The spectral analysis can take place for example by scanning, digitizing, and subsequent Fourier transformation.

For the special case where rain, fog, hail or snow are detected as reflection objects, and with allowance for the approximations $d \approx 0$ and $v_r \approx v_e$, frequency increases 12, 13, 14 and 15 result in:

$$f_{D12}=f_{D13}=f_{D14}=f_{D15}=2 \cdot f_T \cdot v_e/c$$

Thus the same frequency increases arise in all modulation ramps, independently of the modulation amplitude, while "normal" target objects (for example other vehicles) exhibit frequency increases which are dependent on the modulation amplitude. The corresponding frequency environment can be tested for weak detection using a suitable filter in all modulation ramps. Detection can be guaranteed through the correlation of the frequency increases obtained across all of the ramps of a number of measurements. The amplitude of the detection is a measure of the atmospheric scattering of the radar waves, i.e., a measure of the density of the rain or snow.

The relationship or the characteristic intermediate frequency signals are utilized according to the present invention to identify the weather condition "bad weather" in the vicinity of the motor vehicle on the basis of the analysis of frequency increases 12, 13, 14 and 15. The weather condition "dryness" is the result in the cases where the above relationship is not fulfilled.

Reflection objects which are located directly on the motor vehicle radar system, for example dirt on a cover of the system, are distinguished according to the present invention by the fact that the distance of the reflection object is $d \approx 0$ and that the relative speed of the detected object is $v_r \approx 0$. In other words: If a curve of the frequency of received signal 11 is produced which matches the curve of the frequency of transmitted signal 10, it can be concluded that there is a disturbance from soiling, or in general that the motor vehicle radar system is "covered." Here the characteristic intermediate frequency signals are practically 0:

$$f_{D12}=f_{D13}=f_{D14}=f_{D15}=0$$

According to the present invention therefore, the overall finding on the basis of the characteristic intermediate frequency signals ($f_{D12}=f_{D13}=f_{D14}=f_{D15}$) is the detection of a weather condition in the vicinity of the motor vehicle and/or a disturbance in the motor vehicle radar system.

The frequency or number of the detected rain, fog, snow or hail drops thus allows some conclusion to be drawn about the present range and/or present system performance of the motor vehicle radar system. For this purpose it is possible for example to store a characteristic map in a memory unit of the motor vehicle radar system for determining the present range and/or the present system performance, containing at least characteristic intermediate frequency signals ($f_{D12}=f_{D13}=f_{D14}=f_{D15}$) and correspondingly assigned range and/or system performance values. A speed recommendation can be signaled to the driver of the motor vehicle on the basis of the identified range or the identified system performance.

What is claimed is:

1. A method for measuring a distance and a speed of an object using electromagnetic waves in a radar system of a motor vehicle, comprising the steps of:
   transmitting and simultaneously receiving the electromagnetic waves;
   modulating the transmitted electromagnetic waves in a shape of a ramp;
   mixing with the transmitted electromagnetic waves at least signals received during one rise and one drop of a frequency of the transmitted electromagnetic waves;
   forming a number of intermediate frequency signals;
   calculating the distance and the speed of the object in accordance with the number of the intermediate frequency signals; and
   identifying at least one of a weather condition in a vicinity of the motor vehicle and a disturbance in the radar system on the basis of those of the number of the intermediate frequency signals that are characteristic intermediate frequency signals.

2. The method according to claim 1, wherein:
   the characteristic intermediate frequency signals correspond to those of the number of the intermediate frequency signals that have approximately the same magnitude with respect to each other.

3. The method according to claim 1, wherein:
   the identified weather condition includes one of dryness and bad weather.

4. The method according to claim 1, wherein:
   a soiling of a covering of the radar system is identified as the disturbance in the radar system.

5. The method according to claim 1, further comprising the step of:
   determining, on the basis of at least one of the identified weather condition and the disturbance, at least one of a present range and a present system performance of the radar system.

6. The method according to claim 5, further comprising the step of:
   storing in a memory unit of the radar system a characteristic map for determining at least one of the present range and the present system performance, the characteristic map containing at least the characteristic intermediate frequency signals.

7. The method according to claim 5, further comprising the step of:
   signaling a speed recommendation to a driver of the motor vehicle on the basis of the determined present system performance.

* * * * *

UNITED STATES PATENT AND TRADEMARK OFFICE
CERTIFICATE OF CORRECTION

PATENT NO.   : 6,633,815 B1
DATED        : October 14, 2003
INVENTOR(S)  : Klaus Winter et al.

It is certified that error appears in the above-identified patent and that said Letters Patent is hereby corrected as shown below:

Column 1,
Line 3, insert heading -- Field of the Invention --
Lines 5-6, change "speed of objects according to the preamble of the main claim" to -- speed of objects. --
Lines 27-28, change "German Patent Application 40 40 572 A1" to -- German Published Patent Application No. 40 40 572 --
Line 38, change "Application 42 42 700 A1" to -- Application No. 42 42 700 --

Signed and Sealed this

Tenth Day of May, 2005

JON W. DUDAS
*Director of the United States Patent and Trademark Office*